United States Patent Office 2,872,980
Patented Feb. 10, 1959

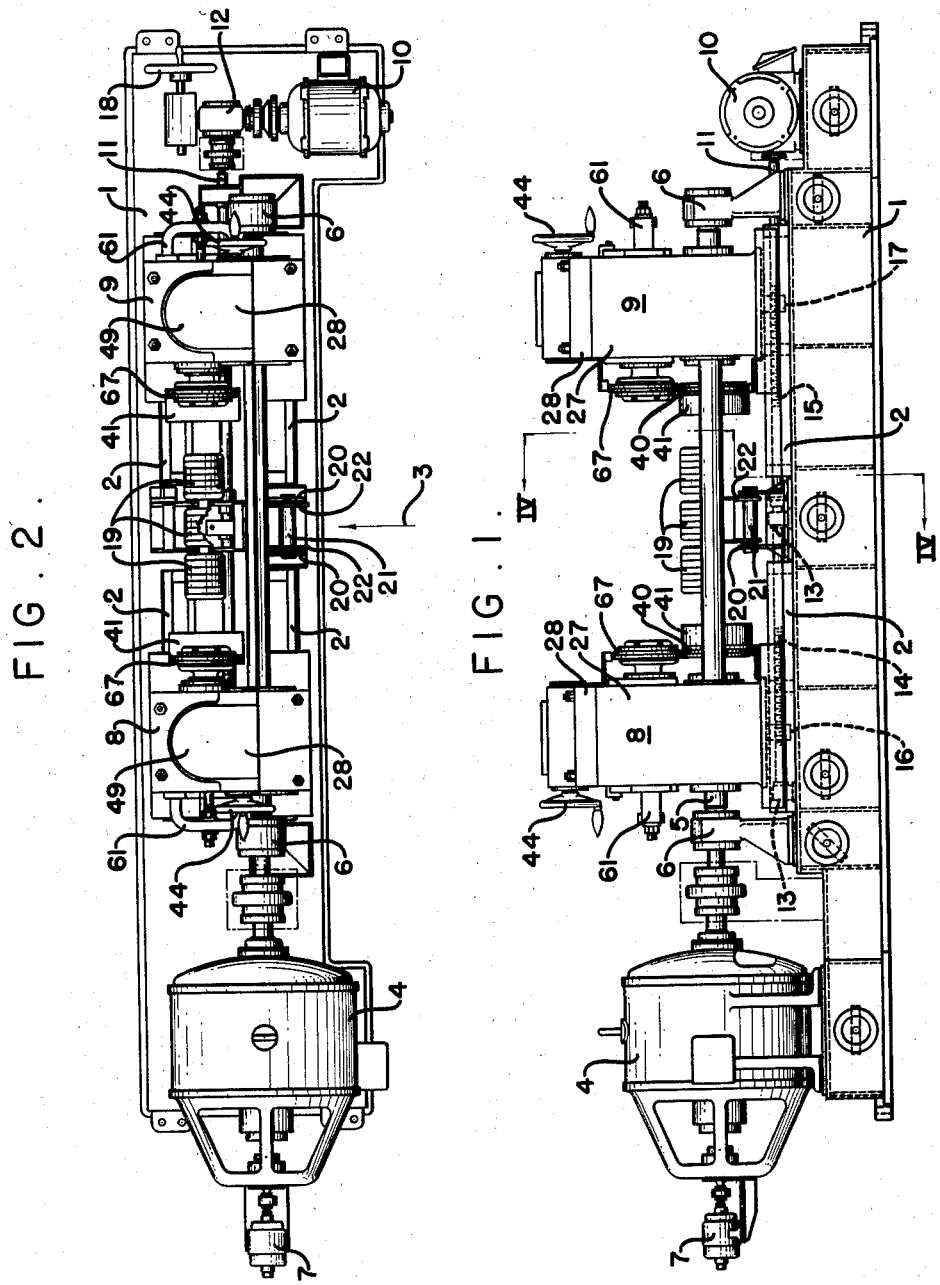

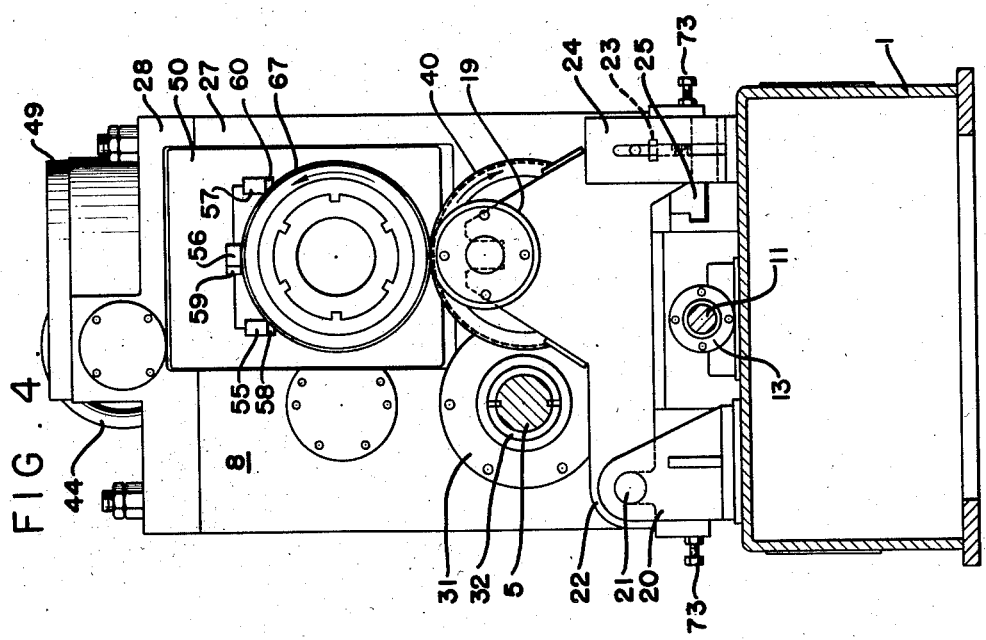
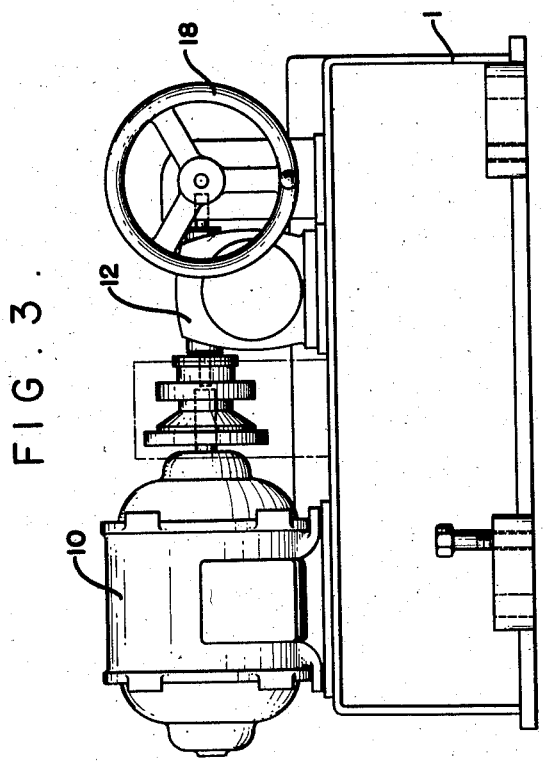

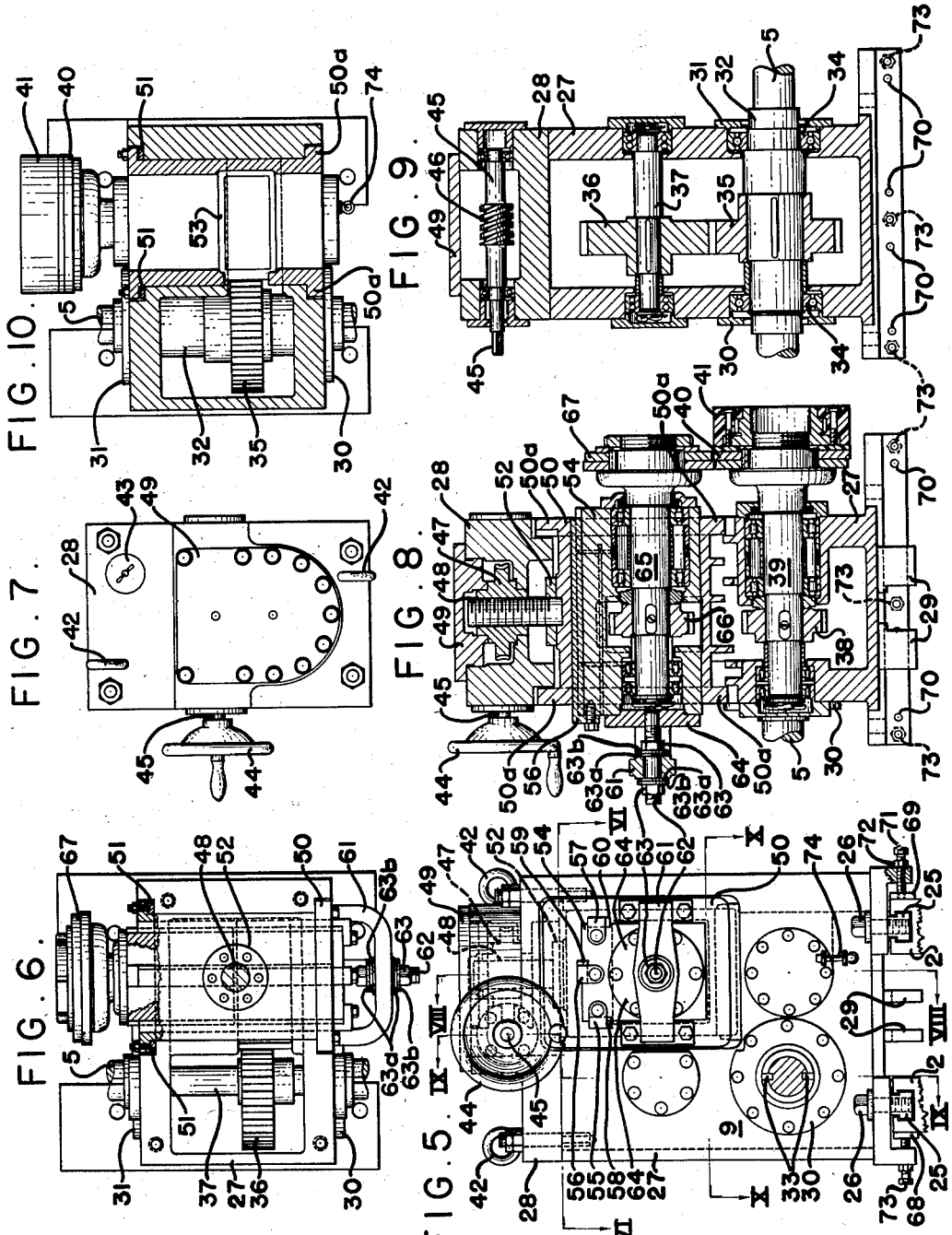

2,872,980

APPARATUS FOR TRIMMING STRIP

Sterling O. Perrine, Warren, Ohio, assignor to The Wean Engineering Company, Inc., Warren, Ohio, a corporation of Ohio Application February 20, 1956, Serial No. 566,439

8 Claims. (Cl. 164—60)

This invention relates to the trimming of strip and more particularly to the trimming to width of wide thin strip.

Heretofore, it has been customary to trim strip to a desired width during processing of the strip. Conventionally, strip is passed through a trimmer comprising a pair of circular knives acting upon each edge of the strip. Because of consumer demands, the gauge of strip which is so handled has become thinner and the speeds at which it is handled have increased in order to secure increased output from the equipment. It has been found that with increasing speeds and thinner gauges, conventional strip trimmers tend to tear or rupture the strip. They further tend to irregularly stretch the strip along the edges with the result that after trimming the edges are frequently longer than the central axis of the strip and are, therefore, rippled. Further, it has been necessary to shut down existing strip trimmers at intervals for the purpose of sharpening or replacing knives.

By use of my invention, I am able to trim strip at speeds far in excess of those heretofore known without impairing the quality of the finished product and, at the same time, to prolong the life of the knives used in trimming the strip.

I provide a strip trimmer having adjustably positioned supporting means and cutting means supported from the supporting means. I preferably provide a housing, a carriage slidably mounted in the housing, a chuck slidably mounted in the carriage, an arbor mounted in the chuck, and cutting means fixed to the arbor. I prefer to provide means to orient the chuck to the housing and preferably employ keys which are replaceably inserted within the assembly of the carriage and the chuck. I further preferably provide means to make horizontal adjustment of the chuck and vertical adjustment of the carriage.

I prefer to employ a pair of generally opposed strip trimmers having a strip cutting zone therebetween and to cut the edges of the strip as it passes through the strip trimming zone. I preferably provide means to adjust the angle of the cutting means with the axis of the strip passing through the apparatus.

Other details, objects and advantages of my invention will become apparent as the following detailed description of a present preferred embodiment thereof proceeds.

In the accompanying drawings, I have illustrated a present preferred embodiment of my invention in which—

Figure 1 is a side elevational view of strip trimming apparatus embodying my invention;

Figure 2 is a plan view of the apparatus shown in Figure 1;

Figure 3 is an end view of the base section of the apparatus shown in Figure 1;

Figure 4 is a view partly in section of the base and one of the strip trimmers viewed from the strip trimming zone and taken on line IV—IV of Figure 1;

Figure 5 is a side elevational view of one of the strip trimmers shown in Figure 1;

Figure 6 is a plan view of the strip trimmer shown in Figure 5 with the housing cap removed taken on line VI—VI of Figure 5;

Figure 7 is a plan view of the housing cap of the strip trimmer shown in Figure 5;

Figure 8 is a sectional view taken along line VIII—VIII of Figure 5;

Figure 9 is a sectional view taken along line IX—IX of Figure 5; and

Figure 10 is a sectional view taken along line X—X of Figure 5.

Referring now to Figures 1 and 2, the strip trimming apparatus is mounted on a base 1. Slides 2 are provided upon the base upon which the side trimmers may be moved back and forth from the center line of the apparatus to accommodate varying widths of strip. The strip passes through the apparatus in the direction indicated by arrow 3 and its axis is generally indicated by the arrow. The strip may be fed to the strip trimmer from a coil holder or other apparatus and drawn away from the strip trimming apparatus by a reel, other processing equipment or the like. Such apparatus is old and well-known to those skilled in the art and will not be illustrated or further described here. A drive motor 4 is mounted on the base and drives shaft 5 which is mounted in bearings 6. A generator tachometer 7 is provided for the purpose of measuring the speed of the drive motor. Shaft 5 extends through the housings of the two strip trimmers indicated generally at 8 and 9. It will be understood that strip trimmers 8 and 9 are generally similar, but are of opposite construction. Like numbers are used throughout to designate like parts in each strip trimmer. Shaft 5 is slotted to receive feathered keys 33 (Figure 5) which also engage a hollow shaft 32 (Figure 9). The keys are in sliding engagement with shaft 5 thus allowing strip trimmers 8 and 9 to be moved freely along the length of shaft 5. Motor 10 is mounted upon base 1 and drives shaft 11 through gearbox 12. Shaft 11 is mounted in bearings 13 upon base 1 and has threaded portions 14 and 15 which are oppositely threaded. That is to say, one thread is a left-handed thread and the other is a right-handed thread. The threaded portions engage tapped and threaded blocks 16 and 17 respectively. The blocks are secured to the strip trimmers 8 and 9 by lugs 29 (Figures 5 and 8). Rotation of shaft 11 will cause simultaneous movement of strip trimmers 8 and 9 toward or away from the central axis of the strip indicated generally by arrow 3 by virtue of the fact that blocks 16 and 17, being restrained from rotation by lugs 29, will follow the threads upon rotation of shaft 11. A hand wheel 18 may be used to secure fine adjustment of shaft 11.

Strip supporting rollers 19 are positioned between the two strip trimmers in position to support strip passing through the strip cutting zone. A bracket 20 on base 1 supports a fulcrum rod 21 on which one end of roller supporting frame 22 is supported. The opposite end of roller supporting frame 22 is raised or lowered by set screw 23 affixed to a bracket 24 supported from base 1. Slides 2 have slotted openings which receive T-shaped retainers 25 (Figures 4 and 5) affixed to the bottom corners of each strip trimmer. The retainers are attached to the side trimmers by mounting bolts 26 (Figure 5).

Referring now to Figures 5 through 10 in which I have shown strip trimmer 9 in greater detail, the trimmer comprises a housing 27 on which a cap 28 is mounted. The mounting of the strip trimmers on slides 2 and the means of causing their lateral movement for varying widths of strip has been described heretofore. Shaft 5 passes through closures 30 and 31 in housing 27. As previously described, it is keyed to hollow shaft 32 by keys 33. Hollow shaft 32 is journaled in the housing in bearings 34 and comprises the hub of gear 35 which is keyed to it. The fit between shaft 5 and hollow shaft 32 is loose so that the trimmer housing and the hollow shaft may be shifted laterally in the manner previously described. Gear 35 engages a countergear 36 mounted on a countershaft 37 journaled in the housing. Gear 35 also engages lower arbor drive gear 38 which is keyed to lower arbor 39. Lower arbor 39 is likewise journaled in housing 27 and carries a circular knife 40 fixed to its exposed end. Disc 41 is attached to the knife and provides additional support beneath the strip adjacent the point of cutting.

Cap 28 is positioned on the upper side of housing 27. Two lifting rings 42 and a housing vent 43 are attached to the cap. The hand wheel 44 is mounted on shaft 45, journaled in cap 28, on which a worm 46 is mounted in engagement with worm gear 47. Worm gear 47 is threaded on shaft 48 and is rotatably confined between cap 28 and cover plate 49.

Carriage 50 fits into a slot in housing 27. It has lugs 50a at both ends which prevent it from being withdrawn from the housing at either end. Wear strips 51 are attached to the vertical lugs on the inner or strip-trimming side of the housing and provide a snug fit for the carriage in the slot. Sufficient clearance is provided that the carriage is in vertically sliding relationship with housing 27. Shaft 48 is firmly attached to cap 52 which is in turn fixed to the upper face of the carriage. Oil grooves 53 are provided on the lower inner surface of carriage 50.

A chuck 54 is fitted within the opening of the carriage. The fit between the chuck and the carriage is a sloppy one which will permit the chuck to be shifted within the carriage. Chuck 54 is rigidly engaged to carriage 50 by three keys 55, 56 and 57, which are bolted to the face of the chuck and which engage slots in the outer faces of the chuck and the inner faces of the carriage. Wear strips 58, 59 and 60 are fastened to one face of keys 55, 56 and 57 respectively. A yoke 61 is attached to carriage 50 at its two edges. Stud 62 passes through a hole in the central portion of the yoke and carries a lock nut 63 on each side of the yoke. A pair of spherical washers 63a and 63b is placed between each lock nut 63 and yoke 61. The interfaces are spherically ground, one face being ground concave and the other face being ground convex. One end of stud 62 is firmly seated in cap 64 of chuck 54. An upper arbor 65 is journaled in the chuck and has an upper arbor drive gear 66 keyed to it. Upper arbor drive gear 66 is driven from and engages with countergear 36. A circular upper knife 67 is positioned on the exposed end of arbor 65 and is in cutting engagement with lower knife 40. The two cutting edges overlap slightly as shown in Figure 8 and act to trim the edge of strip projecting beyond the point of overlap.

Guides 68 and 69 are attached to lugs at the lower edges of housing 27. Four holes 70 are drilled in each guide and are tapped to receive cap screws 71 (Figures 5 and 9) which have a loose fit in holes drilled through the lugs. Lock nuts 72 are threaded on cap screws 71 and bear on the outer faces of the lugs. Three cap screws 73 are threaded into additional holes in the lugs and bear against the sides of guides 68 and 69. Thus, by proper manipulation of the cap screws and lock nuts, the guides may be indexed in any desired position relative to the strip trimmer. It will be observed that the guides bear against the outer edges of slides 2. Thus, each strip trimmer may be oriented with respect to slides 2 by manipulation of cap screws 71 and 73 and of lock nuts 72. An oil filler pipe 74 is provided to fill the housing with oil.

It will be understood that the components comprising each strip trimmer are separately manufactured and machined before assembly. The slot or window in housing 27 which is to receive carriage 50 is preferably machined so that the upper arbor and the lower arbor will be parallel when positioned in the housing. In other words the machined surfaces of the edge of the slot are preferably machined so that they are parallel to the axis of the bore for the lower arbor. It has been found, however, that the housings frequently acquire a drift or set some time after final machining and gauging. This is particularly true in the case of welded housings which apparently have internal stresses which slowly relieve themselves after final machining by creep of at least some portions of the housings. Apparently, the extent of creep is in part dependent upon the amount of machining which is done to the housing. Thus, at the time of final assembly, it is frequently found that the machined surfaces in the slot have warped somewhat so that the upper and lower arbor are not precisely parallel. If the housings are further machined to correct the warp, further creep will be found thereafter. After the apparatus has been installed and operated, it is frequently found that vibration and heat generated by operation will cause further creep or distortion of the housings resulting in further misalignment of the upper and lower arbors. Previous practice has been to age the housings for many months or to subject them to expensive and time-consuming stress relieving by extensive heat treatment in order to reduce the creep in the housings. Although the misalignment introduced by such housing creep or distortion is of such small magnitude that it has not heretofore been of great consequence, proper alignment is of critical importance where it is desired to trim a paper-thin steel strip at high speeds.

At the time of assembly, carriage 50 and chuck 54 are positioned in the housing, the arbors are placed and their alignment to one another is determined. Keys 55, 56 and 57 and their accompanying wear strips 58, 59 and 60 are machined to properly align the upper and lower arbors. In the usual case where housing creep has taken place subsequent to machining, the keys will be of irregular shape. They will usually be tapered or have non-rectangular cross sections. By appropriate machining of keys 55, 56 and 57, either horizontal or vertical deflection of the upper arbor, or both, may be changed.

When each strip trimmer has been so assembled, each will be mounted on base 1 and the entire apparatus assembled for operation. As heretofore pointed out, additional apparatus, not shown here, is provided to feed strip to the strip trimmer and to remove trimmed strip therefrom. Cap screws 71 and 73 and lock nuts 72 are adjusted to make the desired orientation of each strip trimmer with the strip. By use of motor 10 and hand wheel 18, the two strip trimmers are then adjusted to accommodate the width of strip which it is desired to run through the apparatus. It is apparent that as upper knife 67 revolves, each point on the cutting edge will pass below the level of the trimmed strip as it comes into cutting relationship with lower knife 40. Upon further revolution of the knife, that point will rise past the edge of the trimmed strip. If the cutting edge of the knife is in such a position that it abrades the strip as it rises past the trimmed edge, then the wear on the cutting edge will be increased and the interval between replacement or sharpening of the knives will be reduced. Further, if the rising edges of knives 67 are in contact with the strip, they will carry it up and tend to stretch the edges. This produces a trimmed strip having rippled or wavy edges. Such strip is less readily salable than strip which is entirely flat and unrippled.

If the lower knives 40 are oriented to converge upon the axis of the trimmed strip, the descending cutting edge of each knife 40 will tend to be separated from the scrap metal trimmed from the edge of the strip. This will reduce abrasion of the cutting edge of knife 40 and will increase the time between sharpenings of the lower knives. It will further avoid twisting the trimmed scrap around the lower knife and will allow it to be more readily gathered and disposed of.

Preferably, I orient the strip trimmer housing with the planes of the lower knives converging on the axis of the trimmed strip and orient the upper arbors in the housings with the planes of the upper knives diverging from the axis of the trimmed strip. This will tend to carry the descending cutting edges of the lower knives away from the ribbons trimmed from each edge of the strip and will tend to carry the rising cutting edges of the upper knives away from the edge of the trimmed strip.

To achieve this effect, I prefer to machine keys 55, 56 and 57 to place the upper and lower arbors askew and to orient the strip trimmers 8 and 9 on slides 2 to locate the planes of the lower knives slightly converging on the axis of the trimmed strip and the planes of the upper knives slightly diverging from the axis of the trimmed strip. It is apparent, that the most important consideration in alignment of the arbors is that the rising edge of the upper knife should diverge from the edge of the trimmed strip. For this purpose only, I may optionally locate the upper and lower arbors in parallel alignment and position the strip trimmer with the planes of the upper and lower knives diverging from the trimmed strip.

By use of my invention I am able to trim thin strip having a thickness of the order of 0.006 inch to 0.015 inch at speeds of at least four thousand feet per minute without producing a wavy or rippled strip. This is at least one-third faster than equipment previously known to me could be operated while producing a trimmed strip of like gauge without rippled edges. Further, it will be noted that by use of my invention I am able to prolong the life of the cutting knives by reducing the wear thereon.

While I have described and illustrated a present preferred embodiment of my invention, it is to be understood that I do not so limit it, and that my invention may be otherwise variously practiced within the scope of the following claims.

I claim:

1. In a strip trimmer, a housing, an arbor mounted in the housing, a carriage placed in the housing and vertically movable with respect thereto, means for vertically adjusting the carriage relative to the housing, a chuck mounted on the carriage and keyed thereto for horizontal movement with respect to the carriage, the keys being replaceably inserted within the assembly of the carriage and chuck for realignment of the chuck in the carriage, means for horizontally adjusting the chuck relative to the carriage and an arbor mounted in the chuck.

2. In a strip trimmer, a housing, an arbor mounted in the housing, strip cutting means on said arbor, a carriage placed in the housing and vertically movable with respect thereto, adjustable screw means in engagement with the housing and with the carriage, a chuck mounted on the carriage for horizontal movement, means for selectively aligning the horizontal movement of the chuck with respect to the carriage, an arbor mounted in the chuck, and strip cutting means on said arbor.

3. In a strip trimmer, a housing, means mounted in the housing supporting first strip cutting means, a carriage in vertically sliding engagement with the housing, means for adjustably controlling vertical movement of the carriage with respect to the housing, a chuck mounted on the carriage for horizontal movement, means to limit horizontal movement of the chuck in the carriage to a selected angle, said means being replaceable for selection of different angles, means mounted in the chuck supporting second strip cutting means, the first mentioned cutting means being in cutting engagement therewith.

4. In a strip trimmer, a housing, an arbor mounted in the housing, cutting means fixed to the arbor, a carriage in vertically sliding relationship to the housing, means for vertically adjusting the relationship of the carriage and the housing, a chuck in horizontally sliding relationship to the carriage, horizontal chuck movement guide means in chuck controlling relationship to the carriage and chuck, an arbor mounted in the chuck, and cutting means fixed to said arbor, said cutting means in cutting relationship to first said cutting means.

5. Apparatus for trimming strip comprising a pair of opposed strip trimmers, each of said strip trimmers having a housing, means mounted in each of the housings supporting first strip cutting means, a carriage in vertically sliding engagement with the housing, means for adjustably controlling vertical movement of the carriage with respect to the housing, a chuck mounted on the carriage for horizontal movement, means to limit horizontal movement of the chuck in the carriage to a selected angle, said means being replaceable for selection of different angles, means mounted in the chuck supporting second strip cutting means, the first mentioned cutting means being in cutting engagement therewith, and means to adjustably orient each of said strip trimmers about their vertical axes.

6. Apparatus for trimming strip comprising a pair of opposed strip trimmers, each of said strip trimmers having a housing, an arbor mounted in each of the housings, strip cutting means on said arbor, a carriage placed in the housing and vertically movable with respect thereto, adjustable screw means in engagement with the housing and with the carriage, a chuck mounted on the carriage for horizontal movement, means for selectively aligning the horizontal movement of the chuck with respect to the carriage, an arbor mounted in the chuck, strip cutting means on said arbor, and means to shift said housings about their vertical axes for selective alignment of the cutting means.

7. In a strip trimmer, a substantially enclosed rigid housing, an arbor rotatably mounted in said housing, strip cutting means mounted on said arbor, a carriage mounted in said housing for vertical movement, means to control vertical movement of the carriage, a chuck mounted in said carriage for movement in a horizontal plane, a plurality of means holding the chuck in a selected position in the carriage, said means being removable to place the chuck in another position in the carriage, a second arbor rotatably mounted in the chuck, second strip cutting means on said arbor in cutting relationship with the first said cutting means, and means to drive said arbors.

8. In a strip trimmer, a housing substantially surrounding a carriage mounted in the housing for sliding movement, a chuck in restrained sliding engagement with the carriage, an arbor mounted in the chuck, drive means for said arbor and a strip cutting knife fixed to the arbor.

References Cited in the file of this patent
UNITED STATES PATENTS

| 1,662,871 | Swift | Mar. 20, 1928 |
| 1,985,856 | Evans | Dec. 25, 1934 |
| 2,020,491 | Winters | Nov. 12, 1935 |
| 2,679,900 | Bottenhorn | June 1, 1954 |
| 2,745,663 | Hamilton et al. | May 15, 1956 |